Patented May 15, 1923.

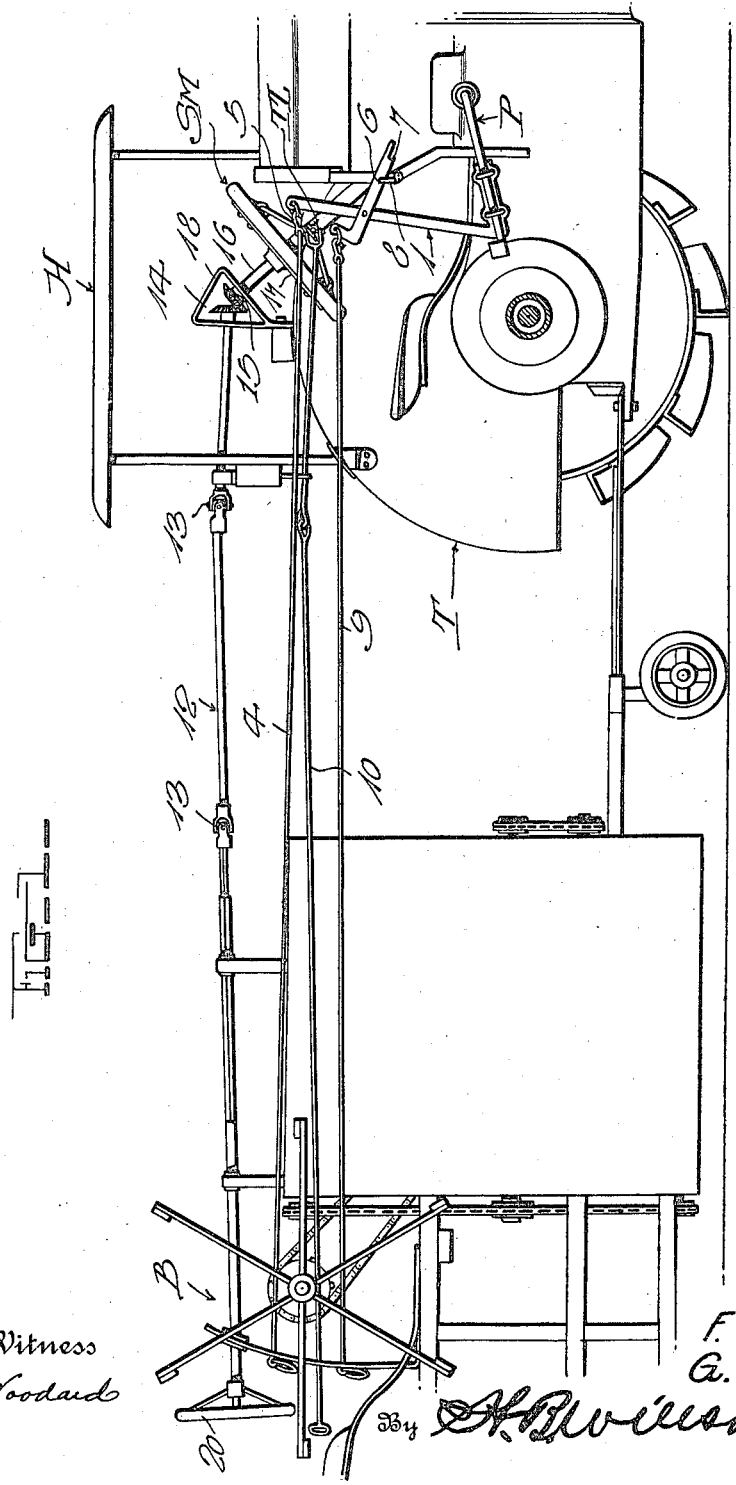

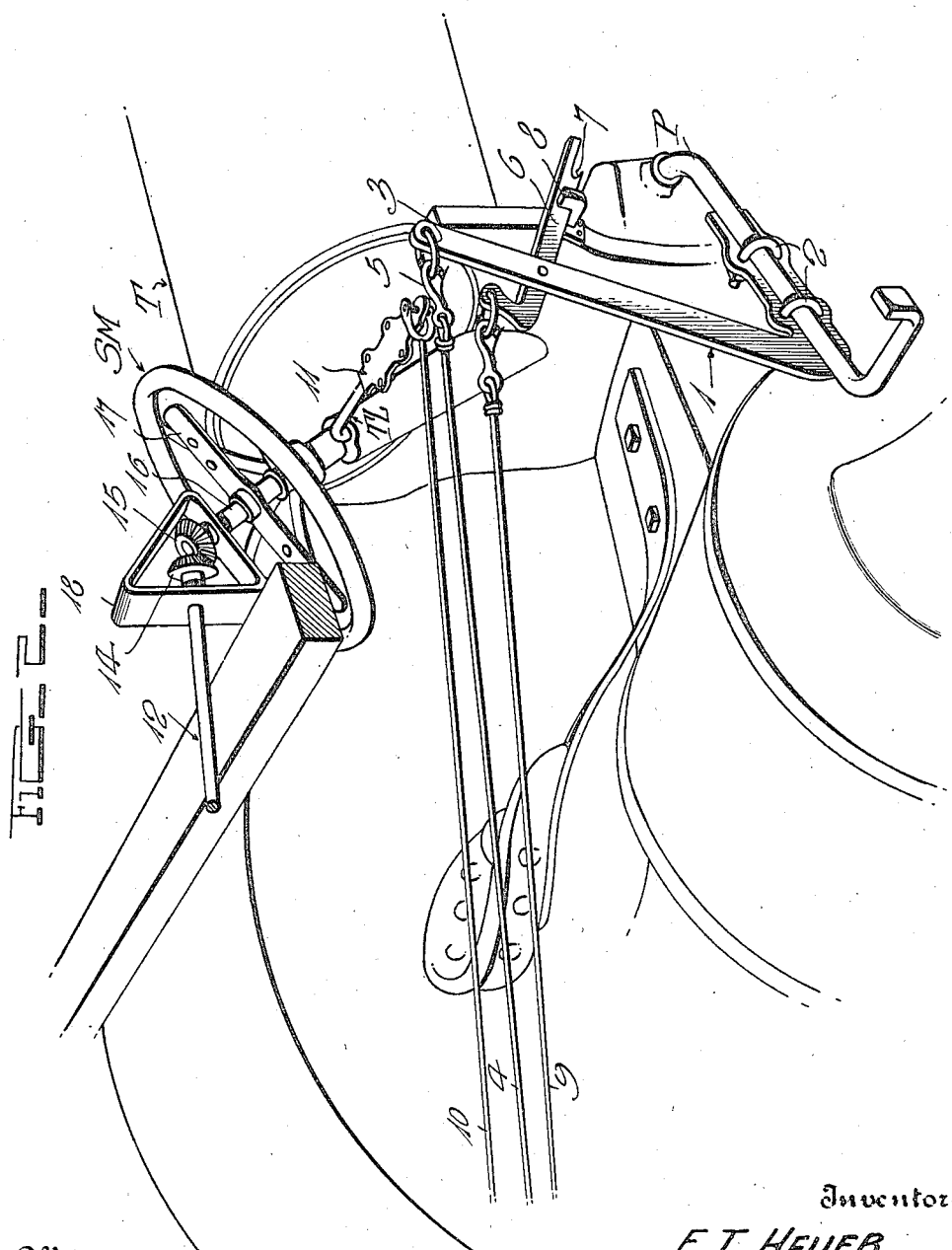

1,455,614

UNITED STATES PATENT OFFICE.

FRED T. HEUER AND GEORGE D. LATTA, OF PRINCETON, ILLINOIS; SAID LATTA ASSIGNOR TO SAID HEUER.

TRACTOR ATTACHMENT.

Application filed November 5, 1920. Serial No. 422,069.

*To all whom it may concern:*

Be it known that we, FRED T. HEUER and GEORGE D. LATTA, citizens of the United States, residing at Princeton, in the county of Bureau and State of Illinois, have invented certain new and useful Improvements in Tractor Attachments; and we do declare the following to be a full, clear, and exact description of the invention, such as will enable others skilled in the art to which it appertains to make and use the same.

This invention relates broadly to improvements in tractors, and it has more particular reference to a plurality of attachments therefor, which permit the tractor to be operated by the same person who operates a binder or other trailer which is connected to the tractor, thus obviating the necessity of employing an additional man or operator for the tractor as is ordinarily done.

The principle object of the invention is to provide a plurality of simple attachments for the clutch operating pedal, throttle lever and steering mechanism which are such that they permit the tractor to be easily and conveniently operated from the trailer.

Other objects and advantages of the invention will be apparent during the course of the following description.

In the accompanying drawings forming a part of this specification, and in which like numerals are employed to designate like parts throughout the same:

Figure 1 is a side elevational view of a portion of a conventional form of tractor and binder connected thereto, disclosing my improved attachments in the manner in which they are associated with these machines.

Figure 2 is an enlarged perspective view of a portion of the tractor disclosing my improved attachments more clearly and the manner in which they are associated with the respective parts to which they are attached.

Referring to the drawings, wherein the preferred embodiment of my invention is clearly illustrated, it will be seen that the letter T designates a conventional form of tractor, which as usual, includes a clutch operating pedal P, a throttle lever TL, and steering mechanism indicated as a whole, by the letters SM. Hitched or connected in any suitable way to the tractor is a trailer which in this instance is in the form of a binder B. All of my attachments consist broadly of flexible connections between the respective parts which they are intended to operate and the trailer, all of these attachments or connections extending rearwardly from the tractor to the trailer and being operated from the latter.

The attachment or connection for actuating the clutch pedal comprises a substantially L-shaped member or bell crank lever 1, the short arm of which is apertured to permit passage therethrough of the opposite ends of U-clips 2 which are passed around said clutch operating pedal in the manner disclosed. Detachably connected to a ring 3 which is carried by the long arm of said member, is an operating rod 4 this being connected to the ring by means of an ordinary snap-fastener 5 and extending rearwardly from the tractor to the trailer to a point within convenient reach of the operator of the latter so that by pulling the rod 4 towards him, he may depress the clutch pedal P to move it to ineffective position. In order to retain this clutch pedal in its ineffective position, I employ a trip device which is in the form of an arm 6 pivoted intermediate its ends to the long arm of said L-shaped member, this trip arm being provided at its free end with a shoulder 7 which is adapted to engage the lateral projection 8 on the tractor. A rope 9 or the like is detachably connected to the opposite end of this trip arm, and this rope serves to disengage the arm 6 from the projection 8 when it is pulled toward the operator of the trailer in the same manner that the operating member 4 is actuated.

The throttle lever is likewise operated by a rearwardly extending rod or similar element 10 which is connected therewith and extends within convenient reach of the binder operator. This rod 10 may be suitably connected with the throttle lever in various ways, it being preferably connected therewith through the medium of a two-part clamp 11 which permits it to be readily attached and detached.

The tractor is steered from the binder by means of a shaft 12 made up of a plurality of elements which are universally connected with one another as indicated at 13, the foremost element of this shaft carrying a beveled gear 14 which is adapted to mesh with a similar gear 15 for the purpose of imparting rotation to the tractor steering rod. The gear 15 may be connected to a steering rod in any suitable manner. The connection in this instance preferably includes an extension 16 which passes through an attaching member 17 connected to the spokes of the steering wheel and operatively connected with the steering rod. A housing 18, which constitutes a bearing for the last named element of the operating shaft 12 and serves as a cover for the gears, is employed, this being preferably connected to a transverse board which is in turn carried by the upright of the hood or canopy H of the tractor. At its opposite end, the shaft 12 is provided with a hand wheel 20 which serves to impart rotation thereto and in turn impart rotation to the steering rod of the tractor.

The operation of the device is as follows: The clutch pedal P in the position in which it is shown in the drawings is ineffective and assuming that it is desired to throw the clutch out to move it to ineffective position, this may be done by pulling rearwardly on the operating rod 4. Such movement of this rod will move the lever 1 in such a manner as to depress or move the clutch pedal downwardly and when the lever 1 has been moved sufficiently, the trip arm 6 will automatically engage the extension 8 and retain the clutch pedal in this ineffective position. To release the clutch pedal, it is only necessary to exert a rearward pull on the rope 9 which will in turn disengage the trip arm and the spring of the clutch pedal will automatically return the latter to operative or effective position. When it is found desirable to decrease or increase the speed by moving the throttle lever, this may be done by moving the rod 10 forwardly or rearwardly as the case may be. It is obvious that rotating the hand wheel 20 in one direction will impart rotation to the steering wheel of the tractor and cause the latter to move in the same direction. A careful consideration of the foregoing taken in connection with the accompanying drawings is thought to be sufficient to enable persons skilled in the art to which this invention relates to obtain a clear understanding of the same, therefore, further description of the operation and application of my improved attachment is thought unnecessary.

From the foregoing description it will be seen that I have devised a plurality of extremely advantageous attachments for a tractor which enable me to operate the latter from a binder or other trailer which is connected to the tractor, thus dispensing with the additional operator who is usually employed to operate the tractor. My improved attachments permit me to effectively steer the tractor, operate the clutch pedal, and actuate the throttle lever. My attachments are extremely simple in construction and easy to attach and detach, and are such in construction that they insure effective operation. These and other advantages and features of my invention have, no doubt, become apparent from the foregoing description.

Since probably the best results may be obtained with the construction and arrangement of parts shown and described herein, this construction and arrangement is taken as the preferred embodiment of my invention. However, I wish it to be understood that various minor changes in the shape, size, and arrangement of parts may be resorted to without departing from the spirit of the invention or the scope of the subjoined claims.

I claim:

1. The combination with a tractor provided with a clutch pedal and a trailer connected to the tractor; of a bell-crank lever detachably connected to the pedal, an operating rod pivotally connected to said lever, extending rearwardly to and being operable from the trailer, a shoulder on said tractor, a trip-lever carried by said first lever and being engageable with the shoulder, and an operating member extending rearwardly from the trip-lever to the trailer, being likewise operable from the latter.

2. In combination, a tractor including a clutch operating pedal, a trailer connected with said tractor, and means associated with said pedal and controlled from the trailer for operating the pedal from the latter.

In testimony whereof we have hereunto set our hands.

FRED T. HEUER.
GEORGE D. LATTA.